Dec. 26, 1944.    J. B. KUCERA    2,365,884
VEHICLE
Filed Oct. 12, 1942

Inventor
Joseph B. Kucera
by Alfred G. Hague
atty

Patented Dec. 26, 1944

2,365,884

UNITED STATES PATENT OFFICE 2,365,884

VEHICLE

Joseph B. Kucera, Traer, Iowa

Application October 12, 1942, Serial No. 461,697

5 Claims. (Cl. 280—33.4)

This invention relates to improvements in vehicles, more particularly of the type known as "trailers," mounted on two wheels and having a tongue or other means for attaching the vehicle to a power-operated vehicle. This type of trailer usually holds the road better and is drawn with less oscillation about the axis as a pivot if the forward end of the trailer is somewhat heavier than the back end, so that part of the load is carried by the vehicle furnishing the power. In trailers of the type used for farm purposes wherein comparatively heavy loads are carried by the trailer and the power for pulling the same is a farm tractor, it is also desirable that a considerable amount of the load be shifted to the tractor for the purpose of increasing the traction between the tractor wheels and the ground surface.

It is also desirable that at such times as the tongue of the vehicle is being attached to or detached from the tractor, the body be maintained in substantially a balanced condition so that the operator may easily lift the tongue from position on the ground to an elevated position in alignment with the tractor hitch, after which the center of gravity may be shifted by simply either moving the tractor forwardly or rearwardly.

It is, therefore, an object of my invention to provide in a trailer of the type above described, improved means whereby the axle supporting the trailer may be easily and quickly shifted forwardly or rearwardly relative to the trailer body, to shift its center of gravity.

More specifically, it is the object of my invention to provide in a vehicle employing a single axle supported between the forward and back ends for balancing purposes, improved means for maintaining the axle parallel with a line transverse of the line of movement of the body at such times as the axle is being moved forwardly or rearwardly, and in connection therewith, means for locking the axle in one of a number of adjusted positions.

My invention consists in the construction, arrangement and combination of the various parts of the device, whereby the objects contemplated are attained, as hereinafter more fully set forth, pointed out in my claims, and illustrated in the accompanying drawing, in which:

Figure 4:
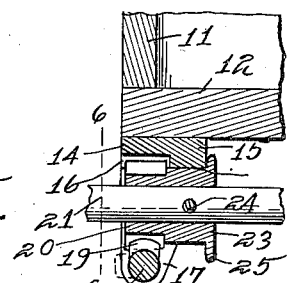
Figure 4 is an enlarged detail sectional view taken on the line 4—4 of Figure 1.
Figure 2:
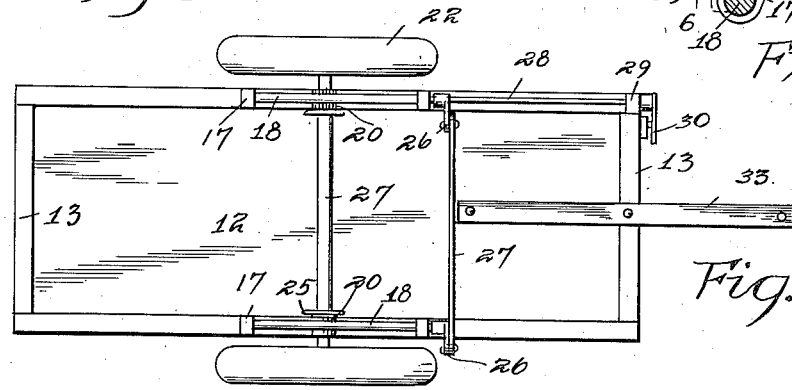
Figure 2 is a bottom view of Figure 1.
Figure 1:
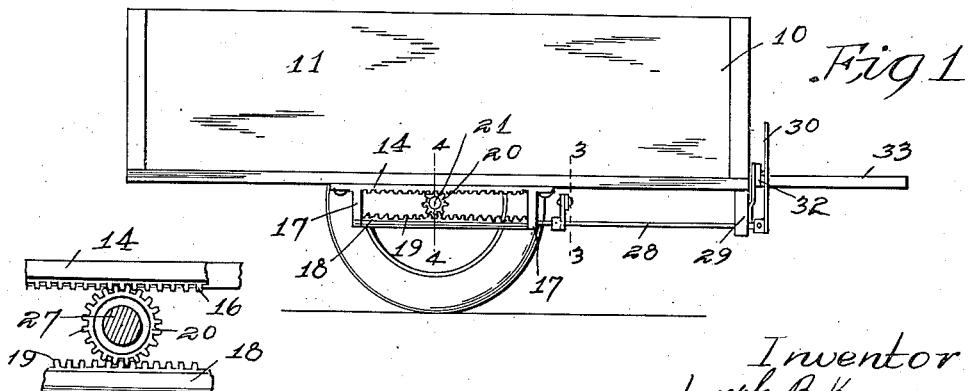
Figure 1 is a side elevation of my improved vehicle with one of the supporting wheels removed.
Figure 6:
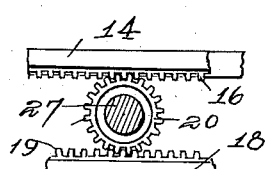
Figure 6 is a sectional view taken on the line 6—6 of Figure 4.

In the accompanying drawing I have used the reference numeral 10 to indicate the vehicle body, which is preferably in the form of a box, having side members 11, a bottom 12, and end members 13. Supported on the under surface of the bottom 12 and adjacent to the central portion of each side edge is a rack bar 14, including a track member 15 (see Fig. 4) the under surface of the track 15 being in alignment with the pitch line of the teeth 16 of the rack. Said rack bar has at each end a downwardly extending lug 17 for pivotally supporting what I shall term a rock bar 18 having teeth 19 on one side adapted to mesh with the teeth of a pinion 20 supported between the rack 14 and the bar 18. The pinion 20 is mounted on the axle 21, which is mounted transversely below the body and between the bars 14 and 18, and provided at each end with supporting wheels 22. Each of the pinions 20 is provided with a roller 23 which is fixed to said shaft by a pin 24, the said roller being of a diameter equal to the pitch diameter of the pinion, to support the track 15. Each of the rollers 23 has a flange 25 adapted to engage the inner edge of the track 15 to limit longitudinal movement of the shaft 21.

Figures 3, 5:
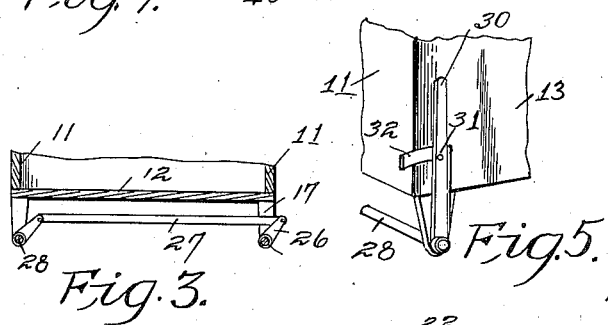
Figure 3 is a detail sectional view taken on the line 3—3 of Figure 1.
Figure 5 is a detail perspective view of the lever for controlling the locking device.

The forward end of each of the bars 18 is provided with a rock arm 26, to which a link 27 is connected, one of the bars 18 being provided with a forwardly extending shaft 28 extending through a bearing 29 at the forward end of the box. A lever 30 is fixed to the forward end of the member 28 and is provided with a pin 31 to engage a sector plate 32 carried by the forward end of the body, having one or more depressions for receiving said pin, wherein the lever may be frictionally retained against swinging movement. By this arrangement it will be seen that if the lever 30, as viewed in Figure 5, is swung in an anti-clockwise direction, then the shaft 18, as viewed in Figure 4, will also be rotated in an anti-clockwise direction to the dotted line position, to cause the teeth 19 to disengage the teeth 16 of the bar 14. When this is accomplished, then it will readily be seen that if the body 10 is moved forwardly or rearwardly, the shaft 21 will be rotated, causing the pinions 20 to be rotated and the shaft to travel relative to the body either forwardly or rearwardly until the desired balanced condition is obtained, after which the lever 30 may be again operated in a clockwise direction, causing the shaft 19 to mesh with the teeth of the pinion 20, thereby providing means for locking the shaft in its desired position.

In practical operation, assuming that the tongue 33 is disengaged from the tractor and is resting on the ground surface and that the body is balanced fore and aft, then the operator simply elevates the tongue to the desired position with comparatively little effort and connects the same to the desired tractor. The body may then be loaded in the balanced condition, if so desired, or the shaft may be shifted rearwardly, if it is desired, to carry a heavier portion of the load in front. The operator then simply releases the teeth 19 from the pinions, advances the tractor and the vehicle, which allows the shaft and the rollers 23 to roll rearwardly until the desired position is obtained, after which the tractor may be stopped and the lever 30 again operated to latch the shaft in the desired position. This operation may be performed either before or after the body is loaded, or the balancing condition can be obtained by moving the body rearwardly relative to the axle.

Figure 7:
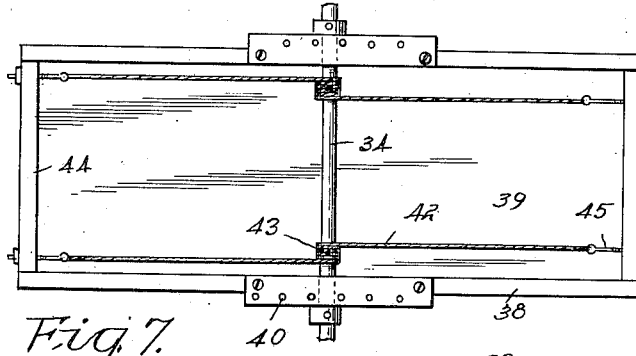
Figure 7 is an inverted plan view of a slightly modified form.
Figure 8:
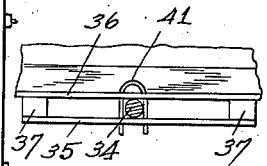
Figure 8 is a detail sectional view illustrating the device for locking the axle against movement as carried out in my modified form.

In Figures 7 and 8 I have illustrated a slightly modified form wherein the axle 34 is mounted between two horizontal plates 35 and 36, spaced apart by means of blocks 37, the plates being of such width that their outer edges project beyond the outer edge of the sill members 38 of the body 39, said plates being provided with openings 40, the openings in the upper plate being in vertical alignment with those in the lower plates and adapted to receive U-shaped bolts 41 to straddle the shaft 34 for the purpose of locking the shaft in any of its forward or rearward positions of movement, the shaft 34 being maintained in its transverse position of alignment at all times by means of flexible members 42, such as cables, which are wound around the shaft a number of times to form coils 43, the central portions of the coils being fixed to the shaft, the flexible ends of the cables being fixed to cross bars 44 by means of threaded bolts 45.

Therefore, it will be seen that I have provided a simple, durable and inexpensive means for balancing a two-wheeled vehicle, such as a trailer, wherein the load may be distributed as desired, and with comparative ease on the part of the operator.

I claim as my invention:

1. In a trailer, a frame unit, a rotatable axle positioned transversely of said frame unit, means movably supporting said frame unit on said axle for adjustable movement forwardly and rearwardly of said axle including a track portion on said frame unit supported on said axle, with said axle, on adjustment of said frame unit, being rotatable on said track portion to provide a roller support for said frame unit, means movable with said frame unit and connected with said axle to maintain the axle in said transverse position as said frame is moved, and means for releasably locking said frame unit in an adjusted position against any forward or rearward movement relative to the axle.

2. In a trailer having a frame unit and an axle extended transversely below the frame unit, means providing for an adjustable forward and rearward movement of said frame unit relative to said axle including a pair of rack bars positioned opposite each other transversely of said frame unit, a track member corresponding to each rack bar, a pair of rollers fixed on said axle for supporting corresponding track members, a gear rotatable with each roller and in meshing engagement with a corresponding rack bar, a second rack bar in meshing engagement with each gear, means pivoting a second rack bar for rotation about its longitudinal axis to provide for the second rack bars being moved into and out of meshing engagement with a corresponding gear, with said frame unit being freely movable relative to said axle when the second rack bars are out of meshing engagement with corresponding gears, and locked against movement relative to the axle when the second rack bars are in meshing engagement with corresponding gears.

3. In a vehicle having a frame, a shaft mounted transversely below the frame, means providing for a forward and rearward movement of said frame relative to said shaft including a pair of rack bars positioned opposite each other transversely of said frame, a track corresponding to each rack bar, a pair of rollers fixed on said shaft for supporting a corresponding track, each roller having a gear portion in meshing engagement with a corresponding rack to maintain the axle transversely of said frame during said movement of the frame, and means for releasably locking said gear portions against rotation to hold said frame against rearward and forward movement relative to said axle.

4. In a trailer including a frame unit and a supporting axle positioned below and transversely of the frame unit, means providing for an adjustable movement of said frame unit forwardly and rearwardly of said axle including a pair of longitudinally extending rack bars spaced apart and secured to the bottom of said frame unit, a pair of pinions fixed to said axle and having one side in meshing engagement with a corresponding rack bar, a rockable rack bar opposite each of said fixed rack bars adapted to be engaged and disengaged with an opposite side of a pinion as the rockable rack bar is rocked, means operatively connecting said rockable rack bars to operate in unison, and hand-operated means for rocking said rockable racks, with said pinions being locked against rotation to hold said frame unit against movement relative to said axle when said rockable rack bars are in meshing engagement therewith.

5. In a trailer having a frame unit and an axle positioned transversely of and below the frame unit, means providing for the movement of said frame unit to adjusted positions forwardly and rearwardly relative to said axle including upper and lower longitudinally extending guide plates spaced apart and attached to each side of said frame unit, said axle having each end thereof rotatably supported between corresponding guide plates, and with an upper guide plate supported on said axle, said axle, on adjustment of the frame unit, being rotatable on said upper guide plates to provide a roller support for said frame unit, flexible members extended longitudinally of said frame unit, each flexible member having one end portion connected to said axle and adapted to be wound about said axle, and means connecting the opposite end of each flexible member to said frame unit, with said flexible means acting to maintain said transverse position of the axle during the adjustable movement of said frame unit.

JOSEPH B. KUCERA.